May 24, 1955  J. GOLINGER  2,708,871
CHARCOAL BROILER GRILL
Filed Feb. 10, 1954                              2 Sheets-Sheet 1
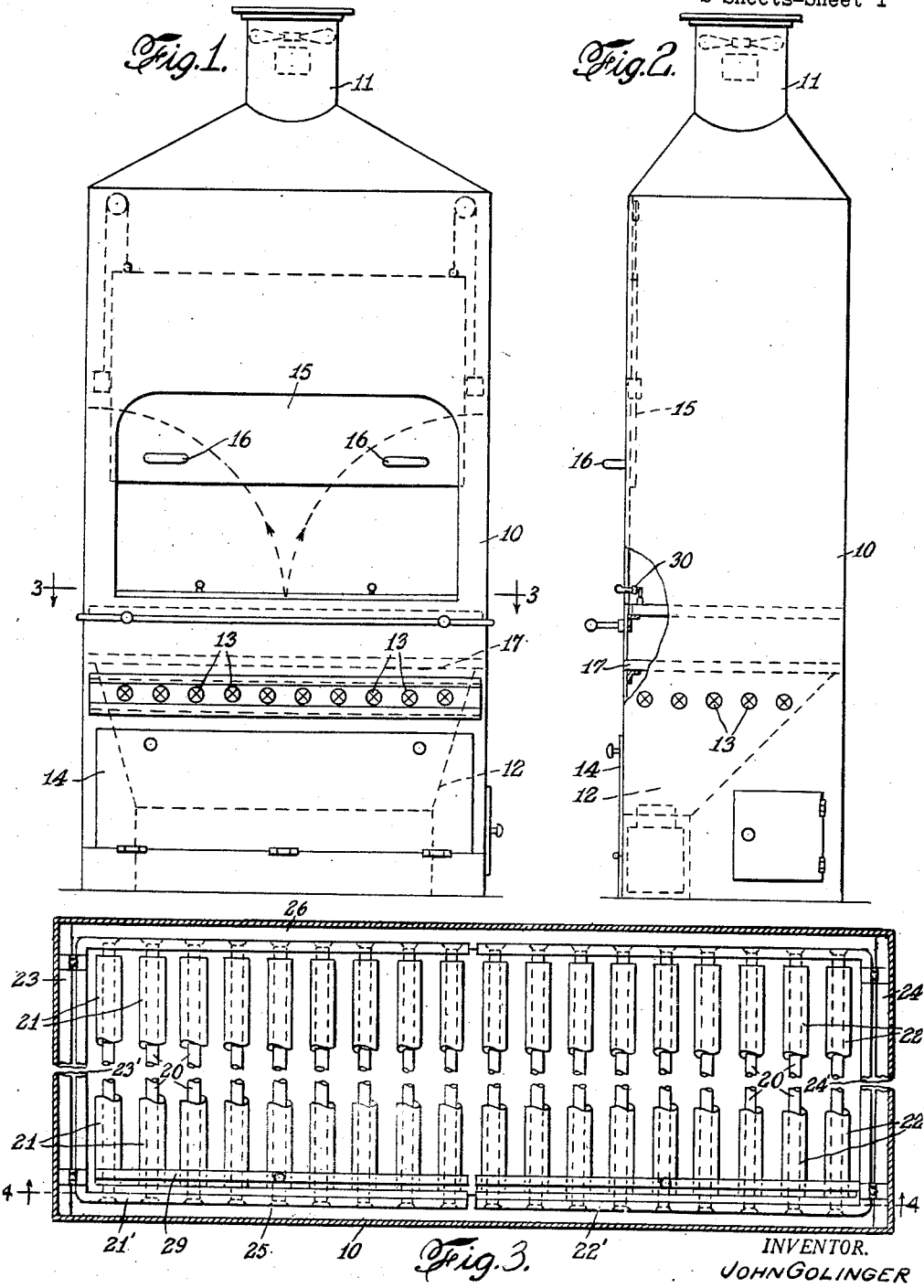
INVENTOR.
JOHN GOLINGER
BY
ATTORNEY

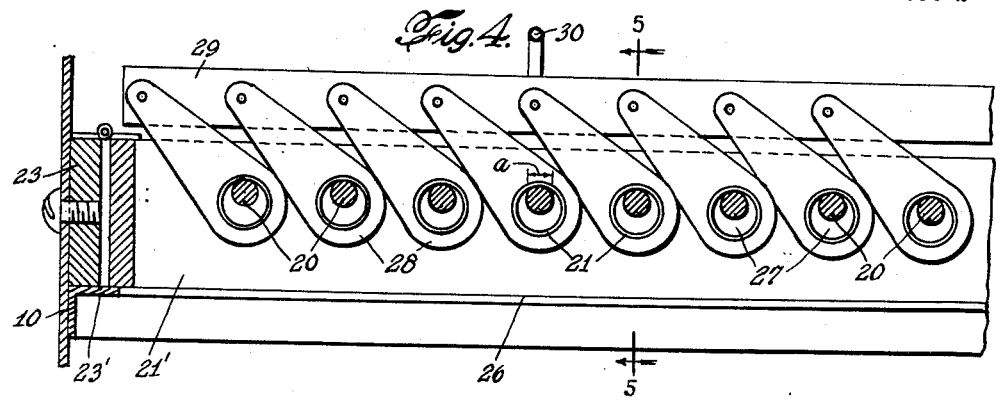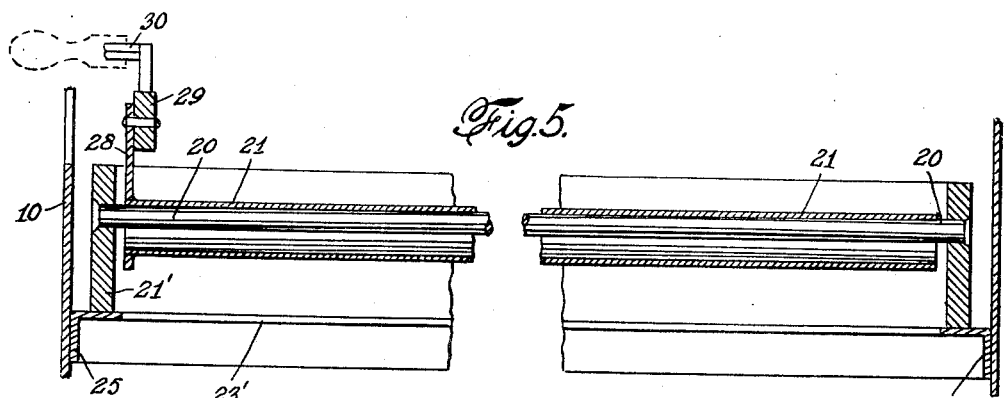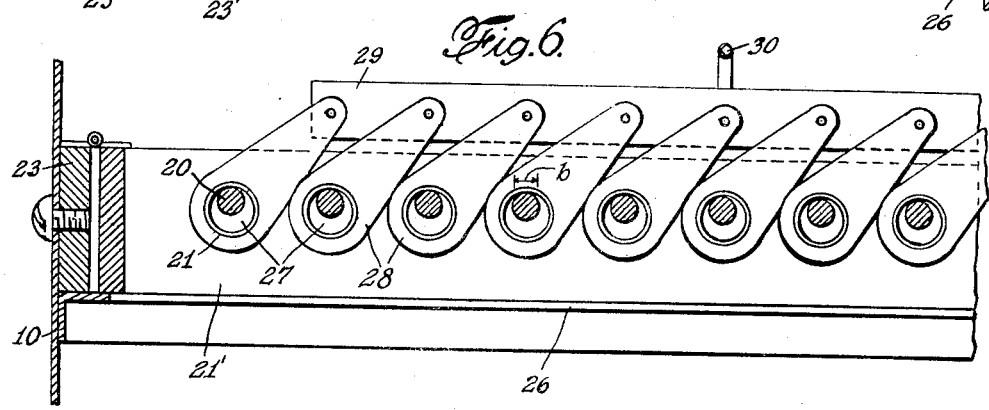

United States Patent Office 2,708,871
Patented May 24, 1955

2,708,871

CHARCOAL BROILER GRILL

John Golinger, Astoria, N. Y.

Application February 10, 1954, Serial No. 409,283

3 Claims. (Cl. 99—423)

The invention relates to broiler apparatus designed for the broiling of meats, etc., upon a grill member; and more especially to apparatus in which charcoal is utilized to provide the required heat radiated from a fuel grate member located beneath said grill member. In the operation of such grill broiler apparatus, it is particularly desirable to secure an intense heat on the grill as well as to insure a clean surface of its elements.

It is an object of my invention to provide a novel arrangement of grill and grate members whereby heat may be more uniformly and most efficiently applied to the substance to be broiled.

A further object of the invention is to provide a novel mounting of the elements receiving the substance to be broiled whereby the latter will be most effectively grilled, and the tendency for said substance to stick to the said elements be minimized.

A still further object of the invention is to provide means for maintaining, during operation, the grill elements relatively clean; also to enable fresh, hotter surfaces thereof to be presented during the broiling operation.

Another object of the invention is to provide means for imparting to the individual grill elements a partial rotation.

In carrying out the invention, there is mounted within a suitable housing, provided at the front with slides and doors to admit access to the interior of said housing, a grate for combustible material (charcoal). Over this is located the frame of a grill of novel design, the same embodying parallel rods secured fixedly in the said frame in a common plane. These rods each serve to receive a tubular element of an internal diameter appreciably greater than the diameter of the rods, so that the elements are suspended on their respective rods and may be rotated thereon. Provision may be made to rotate all tubular elements simultaneously through a displaceable bar or the like which may be manually or mechanically controlled to rock the tubes.

The nature of the invention, however, will best be understood when described in connection with the accompanying drawings, in which:

Fig. 1 is a front elevation of a grill apparatus embodying the novel grill arrangement.

Fig. 2 is a side elevation thereof, with portion of the housing wall broken away.

Fig. 3 is a detail fragmentary horizontal section, on an enlarged scale, through the apparatus, taken immediately above the grill and looking in the direction of the arrows.

Fig. 4 is a fragmentary vertical section, on an enlarged scale, taken on the line 4—4, Fig. 3, and looking in the direction of the arrows.

Fig. 5 is a transverse section, taken on the line 5—5, Fig. 4, and looking in the direction of the arrows.

Fig. 6 is a view similar to Fig. 4 but showing the grill elements rotated through an arc of 90°.

Referring to the drawings, the novel grate-grill combination is mounted preferably within a housing 10 having a flue or chimney 11 and an ash pit 12, which is provided with controllable vents 13 for combustion air. A clean-out door 14 is provided at the bottom; and a door or slide 15 provides access to the grill and may be manipulated through its handles 16. No claim is made to the foregoing, nor to the grate 17 located in the lower portion immediately above the vents 13.

Above the grate 17 there is provided a grill of novel construction, the same being designed to present a more intense broiling surface and as well as admitting of the presentation during broiling of fresh surface portions for contact with the substance being broiled. To this end, the substance does not rest directly upon rods or bars such as constitute a conventional grill; but while a series of parallel rods 20 are supported, preferably fixedly, in a common plane by a carrying frame, these rods serve merely as suspension means for the actual grill elements 21 and 22. It is preferred to make the grill in two or more parts, as shown, for more ready access in charging the grate; and to this end they are hingedly mounted to swing upwardly against the side of the housing. Thus, the two frame halves 21' and 22' are hinged along the respective sides to the corresponding side of the housing through bars 23, 24, the frames resting on angle ledges 23', 24', respectively. Further ledges 25 and 26 support the frames at the front and back of the grill.

In accordance with the invention, the grill elements are tubular and of an internal diameter which is substantially larger than the diameter of the respective rods. By this expedient, not only are the individual tubular grill elements rotatable on their rods but pockets 27 are formed therein as reservoirs of heated air. These then serve to maintain the upper and broiling surface portion, in contact with the substance being broiled, at a higher and more uniform temperature. Furthermore, since a tubular element is angularly movable on its rod, not only may a supported portion of the substance being broiled be shifted to the intermediate open heating space, but fresh, clean and hotter portions of an element may be brought into contact with the substance during the broiling operation. Better cleaning of these grill elements is also thus made possible.

Rotation simultaneously of the various grill elements of a frame may be effected merely by moving the substance thereover or, for example, by securing fixedly thereover one end of rocker arms 28, the other ends of which arms then being pivoted to a bar 29 which extends transversely over the grill above the same. A handle member 30 fixed to the top of a said bar may serve for manipulation of the grill elements through a temporarily applied auxiliary handle, Fig. 6. Fig. 6 illustrates an angular displacement of 90° of the grill elements of which the surface portion $b$ will replace then the portion $a$ previously active.

I claim:

1. Charcoal broiler grill adapted for operation above a fuel grate, said grill comprising a supporting open frame; a plurality of stationary rods supported in a common plane therein parallel to one another; tubular grill elements hanging freely upon the respective rods to rock thereon, said tubular grill elements being adapted to support the substance to be broiled, and presenting fresh heating surfaces thereto when relative movement is effected therebetween; rocker arms secured at their inner ends to the respective tubular grill elements, and extending upwardly therefrom beyond the top of the frame; and a member common to the rocker arms and pivotally secured to the said rocker arms at their respective outer ends, whereby a limited angular movement may be imparted stimultaneously to said tubular grill elements upon actuation of the member common thereto.

2. Charcoal broiler grill according to claim 1, wherein an operating handle is provided on the member pivotally secured to the rocker arms.

3. Charcoal broiler grill according to claim 1, wherein the supporting frame is transversely divided midway, and means are provided to secure hingedly to the frame the halves at their respective outer ends.

References Cited in the file of this patent

UNITED STATES PATENTS

| | | |
|---|---|---|
| 998,247 | Hulson | July 18, 1911 |
| 1,457,416 | Babbitt | June 5, 1923 |
| 1,993,519 | Miltenberger | Mar. 5, 1935 |
| 2,185,979 | Dumas | Jan. 2, 1940 |
| 2,529,684 | Gass | Nov. 14, 1951 |
| 2,604,842 | Dolce | July 29, 1952 |